(12) United States Patent
Wilson et al.

(10) Patent No.: US 8,559,011 B2
(45) Date of Patent: Oct. 15, 2013

(54) MICRO-SPECTRAL SENSOR

(75) Inventors: Michael Wilson, Alexandria, VA (US);
Thomas G Giallorenzi, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 177 days.

(21) Appl. No.: 13/296,317

(22) Filed: Nov. 15, 2011

(65) Prior Publication Data

US 2013/0120754 A1 May 16, 2013

(51) Int. Cl.
*G01B 9/02* (2006.01)
*G01J 3/45* (2006.01)
*G01N 21/25* (2006.01)

(52) U.S. Cl.
USPC .......................................... 356/455; 356/416

(58) Field of Classification Search
USPC .......................................... 356/451, 455, 456
See application file for complete search history.

(56) References Cited

U.S. PATENT DOCUMENTS

| 5,276,321 | A | * | 1/1994 | Chang et al. | 250/226 |
| 5,760,899 | A | * | 6/1998 | Eismann | 356/326 |
| 5,790,188 | A | * | 8/1998 | Sun | 348/144 |
| 6,495,818 | B1 | * | 12/2002 | Mao | 250/226 |
| 8,081,311 | B2 | * | 12/2011 | Themelis | 356/419 |

OTHER PUBLICATIONS

Mao, Chengye et al. "Airborne Hyperspectral Image Acquisition with Digital CCD Video Camera". Videography and Color Photography in Resource Management, Proceedings of the 16th Biennial Workshop on Videography and Color Photography in Resource Assessment, 1997, pp. 129-140.*

* cited by examiner

*Primary Examiner* — Michael A Lyons
(74) *Attorney, Agent, or Firm* — US Naval Research Laboratory; Suresh Koshy (57) ABSTRACT

Micro-spectral sensors and methods are presented in which a Fizeau wedge interference filter is disposed between a focal plane array and a visible scene with an increasing wedge filter dimension varying along a scan direction, where the scene is scanned along the FPA to obtain light intensity measurements of a given scene location at different times using different FPA sensor elements through different wedge filter thicknesses, and the measurements correlated to the given scene location are Fourier transform to generate spectral data for the location.

18 Claims, 11 Drawing Sheets

MICRO-SPECTRAL SENSOR

BACKGROUND

The present disclosure relates generally to spectrometers and more particularly to compact spectral sensors for obtaining spectral information about visible scenes. Spectrometers are used for hyperspectral imaging (HSI) to identify levels of light intensity in multiple bands of the visible and/or infrared light spectrums. The spectral information or data can be used for a variety of purposes, including capture of images from stationary positions and/or from aircraft or other moving vehicles via sunlight reflected off the surface of the earth or sea to identify structures, personnel, terrain features, etc., as well as to allow identification of material constituents (e.g., color content) of a particular scanned structure or terrain feature. Hyperspectral data analysis in particular allows subpixel material identification by providing a spectral signature (e.g., multiple bands) for each viewed pixel of a captured image. Conventional spectrometers for such applications typically include a grating or prism for light dispersion along with a slit and a detector array. In various applications, however, it is desirable to provide light weight spectrometers (micro-spectral sensors) having small form factors, for example, for installation in small hand-held systems or small unmanned aerial vehicles (UAVs) used in military reconnaissance or other similar operations. The grating or prism in conventional HSI spectrometers dictates the sensor size and previous efforts to shrink these types of devices have met with only limited success. Moreover, the amount of light gathered by such conventional spectrometers is limited by the use of scanned slits and the grating structure, thus inhibiting the ability to image low intensity terrain features. Thus, there remains a need for improved spectrometer designs that can provide advanced HSI spectral data for small UAVs and other applications requiring small sensor size.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. The present disclosure provides micro-spectral sensors and methods using a Fizeau interferometer or other form of wedge interference filter located between a focal plane array (FPA) and a scanned scene, in which the scene is scanned along a scan direction generally along a varying wedge filter dimension to obtain light intensity measurements of a given scene location at different times using different FPA sensor elements through different wedge filter thicknesses. The resulting intensity measurements are correlated to particular scene locations and the correlated data for specific locations is Fourier transformed to provide spectral data for specific locations.

In accordance with certain aspects of the present disclosure, a micro-spectral sensor is provided which includes a focal plane array (FPA) with sensor elements formed in an array having sensing faces disposed in a focal plane. A wedge interference filter, such as a compact thin-film wedge Fizeau interferometer is provided, having a first side generally parallel with the focal plane of the FPA and a second side extending at an angle relative to the first side, with a lens directing incoming light from a scanned scene toward the FPA through the first and second sides of the wedge interference filter. In certain embodiments, the wedge interference filter can be bonded to the FPA along at least a portion of the focal plane, and can be made of solid material or the filter may be made of air, providing reflection of the incoming light from two surfaces formed by the first and second sides.

A processor is included in the micro-spectral sensor, which obtains intensity measurement values from the FPA for individual sample periods as the scene is scanned along a scan direction generally parallel to the direction of the wedge slope. The processor correlates values obtained at different sample periods with a specific location and performs a Fourier transform using the correlated data to generate spectral data for the specific location, which may then be stored in an electronic memory. The micro-spectral sensor may be physically scanned along the scan direction relative to the scene of interest, such as during flight of a UAV along the scan direction. In certain embodiments, the sensor may include a scanning mechanism to rotate the lens and/or the FPA and the wedge to scan the scene across all or a portion of the FPA along the scan direction.

A method is provided in accordance with further aspects of the present disclosure for generating spectral data for a scanned scene. The method includes scanning a scene in a scan direction across all or a portion of an FPA to direct incoming light from the scene toward the FPA through a wedge interference filter having a thickness that varies along the scan direction. The method further includes obtaining a plurality of intensity measurement values from the FPA for each of a plurality of sample periods during scanning, correlating the intensity measurements from multiple sensor elements of the FPA obtained at different sample periods with at least one specific location, as well as performing a Fourier transform using values corresponding to the specific location, and generating spectral data for the specific scene location. The method in certain embodiments may further include storing the spectral data in an electronic memory. In certain embodiments, moreover, the method further includes rotating the FPA and wedge interference filter alone or in combination with rotation of a lens in order to scan the scene across the FPA in the scan direction.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE DISCLOSURE

One or more embodiments or implementations are hereinafter described in conjunction with the drawings, where like reference numerals refer to like elements throughout, and where the various features are not necessarily drawn to scale.

Micro-spectral sensors and methods are provided in which a Fizeau interferometer or other form of wedge interference filter is positioned in an optical path between a scanned scene and a focal plane array (FPA). The scene is scanned relative to the FPA in a scan direction along an increasing or decreasing wedge filter dimension to obtain light intensity measurements of a given scene location at different times using different FPA sensor elements through different wedge filter thicknesses. The obtained intensity measurements are correlated with one or more specific scene locations and the correlated data for such locations undergo a Fourier transform to provide spectral data for specific locations. The improved spectral sensors advantageously employ the wedge interference filter architecture in combination with multiple data samples taken for different wedge thicknesses to facilitate reduction in size and weight of HSI spectrometers, in some cases by two orders of magnitude, along with increased light gathering efficiency, in certain embodiments by approximately a factor of 10.

Referring initially to FIGS. 1-4, an exemplary micro-spectral sensor 100 is illustrated which is positioned above a scene 2 of interest, such as surface terrain beneath an unmanned aerial vehicle (UAV, not shown) carrying the sensor 100, in which two illustrative visually-perceptible structures (features) 4 and 6 are shown in the figure at X direction locations X1 and X2, respectively. The sensor 100 includes a focal point array (FPA) 110 having an integer number N sensing elements, with exemplary elements numerically designated 111-119 . . . N. The FPA 110 is a two-dimensional array of sensing elements disposed in a horizontal array along perpendicular X and Y directions in the illustrated orientation, and the sensing elements 111-119 . . . N of the array 110 individually include sensing faces disposed in a focal plane facing downward in the figure in order to receive incoming light from the direction of the scene 2. Any suitable optical sensors 111-119 . . . N can be used in the FPA 110, including without limitation charge-coupled devices (CCDs), or CMOS type sensors in another embodiment. The sensing elements 111-119 . . . N detect incoming light intensity and the FPA 110 includes suitable electrical interconnections (not shown) for providing intensity measurement values based on sensed incoming light received by the individual sensing elements 111-119 . . . N of the array.

Figure 1:
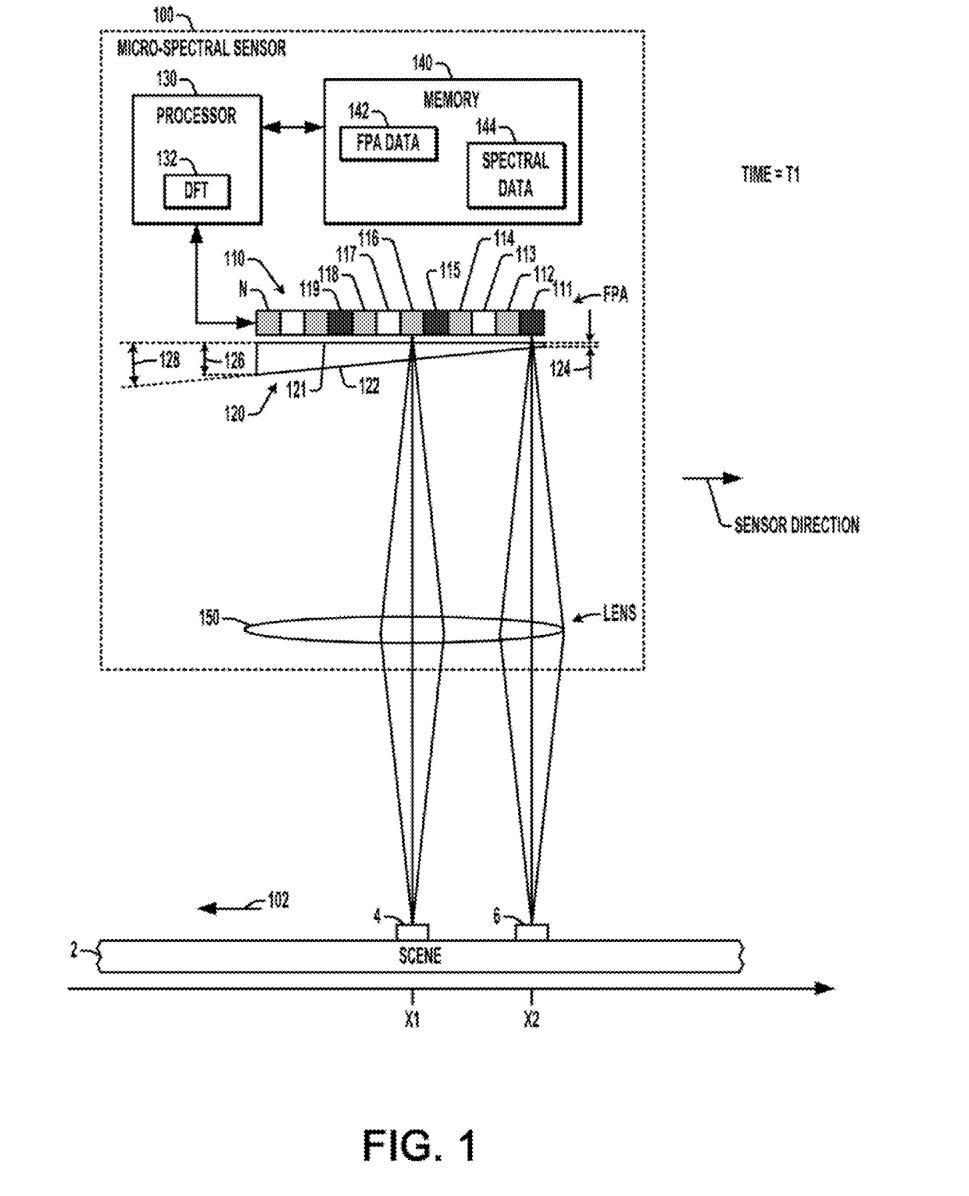
FIG. 1 is a simplified side elevation view illustrating an exemplary micro-spectral sensor with a focal point array (FPA), a Fizeau interferometer wedge interference filter and a lens, as well as a processor and electronic memory in accordance with one or more aspects of the present disclosure.

The sensor 100 further includes a wedge interference filter 120 including first and second sides 121, 122, which are disposed at an angle 128 relative to one another. The sides 121 and 122 are generally planar and provide reflection of incoming light from the direction of the scene 2 from two surfaces formed by the sides 121 and 122. The filter 120 is thus constructed as a wedge shape in which the first side 121 is generally parallel to the focal plane of the FPA 110 as shown, and may be spaced therefrom, or in certain embodiments the first side 121 is bonded to the FPA 110 along at least a portion of the focal plane. In these embodiments, any suitable bonding technique and bonding agents may be used in constructing the FPA/wedge filter structure 110/120. The wedge interference filter 120 can be constructed of any suitable material that provides for reflection of incoming light from the scanned scene 2 from the two surfaces formed by the sides 121 and 122. In certain embodiments, the filter 120 is made of solid material such as glass, having first and second generally planar sides 121 and 122 at a non-zero angle with respect to one another, where the first side 121 may be spaced from, or may be bonded to, the FPA 110. In other embodiments, the wedge interference filter 120 may be made of air or other gaseous material contained between structure forming the sides 121 and 122, wherein the first side 121 may simply be the focal plane surface of the FPA 110. In certain embodiments, moreover, the wedge filter 120 is a compact thin-film wedge Fizeau interferometer having two reflecting surfaces, where the two reflecting surfaces are much less than totally reflecting (e.g., 4-30% in certain embodiments) such that secondary reflections do not significantly contribute to fringe contrast.

The wedge structure 120 has a small thickness 124 (vertical thickness in the orientation shown in the figures) at a first end of the first side 121, and the second side 122 extends in the negative X direction to a second end that is spaced from the first side 121 to define a large wedge thickness dimension 126. Thus, the first and second sides 121 and 122 are in an optical path between the scanned scene 2 and the FPA 110. The X direction in FIG. 1 defines a scan direction 102 for operation of the micro-spectral sensor 100 that is parallel to the focal plane of the FPA, such that the scan direction 102 is generally parallel to a line extending between the opposite first and second ends of the first side 121, and the thickness of the wedge interference filter 120 changes along the scan direction 102. It is noted that incoming light from the underlying scene 2 will pass through different filter thicknesses depending on the location along the X direction (along the scan direction 102), such that incident light received at the sensor element 111 passes through a shorter wedge thickness than does incident light reaching sensor element 118, for example. In general, the thickness variation as a function of position along the scan direction 102 changes linearly, wherein the illustrated embodiment provides substantially planar first and second sides 121 and 122, although this is not a strict requirement of the present disclosure and embodiments having one or more non-planar wedge filter sides are contemplated as falling within the scope of the present disclosure.

In the illustrated embodiments, the filter 120 is a compact thin-film wedge Fizeau interferometer structure, and is positioned between the scanned scene 2 and the FPA 110. In operation of the sensor, the FPA 110 is swept across the ground scene 2 such that each potential thickness layer (and hence interference thickness) of the wedge structure 120 is swept across each ground location 2, 4 of the scanned scene 2. The scanning, in this regard, can be any relative motion of the scanned scene 2 relative to the FPA 110 generally in the scan direction 102, where the scanning can be along the direction 102 (to the left) as shown in the figures, or can be in the opposite direction (to the right) such that the thickness of the wedge structure 120 through which incoming light from a given position on the scene 2 passes changes with successive data sampling by the FPA 110 during scanning.

As seen in FIGS. 1-4, the micro-spectral sensor 100 also includes a lens 150 that directs incoming light from the scanned scene 2 toward the FPA 110 through the first and second sides 121, 122 of the wedge filter structure 120. Any suitable single or multiple-lens structure can be used to collimate or otherwise direct light in a controlled fashion from the scene 2 toward the focal plane of the FPA 110 such that the light passes through the wedge filter 120. In certain embodiments, moreover, the lens 150 may be movable to facilitate scanning operation, and also the combination of the FPA 110 and the wedge filter 120 can be mechanically movable (e.g., rotatable) in order to facilitate scanning, as discussed further below in connection with FIGS. 5-8. In this regard, the FPA 110 and the wedge filter 120 in certain embodiments are generally fixed relative to one another.

The exemplary micro-spectral sensor 100 advantageously employs Fizeau interferometer principles to realize a small form factor ("micro") spectrometer, which can be scanned by movement of the entire sensor 100 apparatus 100 relative to the scanned scene 2 along a sensor direction generally parallel with the scan direction 102 as shown, or which can perform scanning through mechanical scanning mechanisms 104 (e.g., FIGS. 5-8). The use of the Fizeau type spectrometer 100 advantageously improves light gathering efficiency over conventional grating spectrometers since a number of incident light intensity measurement values are integrated all the time during operation. Since all incident light is generally used in the FPA 110, the sensor device 100 has a very high collection efficiency, which may in certain embodiments be approximately two orders of magnitude greater than conventional diffractive spectrometers. This increased optical throughput facilitates reduction in the overall size of the sensor system 100, and in particular enables the use of smaller lens structures 150. In addition, no dispersive gratings are needed whereby the form factor of the resulting sensor 100 can be reduced. Thus, the disclosed micro-spectral sensor 100 provides significant advantages over conventional devices, particularly with respect to application such as UAVs in which small size and low weight are desirable. In particular, for a given amount of incident light collection (optical throughput), particular designs that formerly occupied approximately 500 cm$^3$ using diffusion grating structures, etc., can be implemented in approximately 0.6 cm$^3$ using the Fizeau spectrometer concepts disclosed herein.

As seen in FIG. 1, a processor 130 and an electronic memory 140 are provided in the micro-spectral sensor 100 in order to implement on-board processing of light measurements obtained from the FPA 110 during scanning. The processor 130 can be any suitable form of electronic processing device or devices, including without limitation, microcontrollers, microprocessors, DSPs, programmable logic, etc., which may be operated according to program instructions stored internally or in the electronic memory 140. The memory 140 further provides storage for data including incident light intensity measurement values 142 received from the FPA 110 (FPA data) as well as processed spectral data 144 generated by transformation of measurement values 142. In operation, the processor 130 is used to implement a Fourier transformation of the FPA data 142, such as using discrete Fourier transform (DFT) processing techniques, in order to generate the spectral data 144.

During scanning operation, the processor 130 thus obtains intensity measurement values from the FPA 110 for each of a plurality of sample periods as the scene 2 is scanned across at least a portion of the FPA 110 along the scan direction 102, and stores the intensity values 142 in the memory 140. The processor 130 is also programmed to correlate the intensity measurement values 142 from multiple sensor elements (e.g. elements 111-119 . . . N) of the FPA 110 obtained at different sample periods with respect to at least one specific location in the scanned scene 2 (e.g., locations 4 and 6 in FIGS. 1-4). In this manner, a number of different measurements corresponding to a given location 4, 6 in the scanned scene 2 are obtained by the FPA (by different sensor elements 111-119 . . . N thereof) at different sample periods, and which correspond to received light that passes through different thicknesses of the wedge interference filter 120. The processor 130 performs the Fourier transformation processing (e.g., DFT algorithm 132) using the intensity measurement values 142 corresponding to the specific scene location(s) 4, 6 to generate spectral data 144 for the specified location(s) 4, 6, and stores this spectral data 144 in the memory 140. The sensor 100 may also include various data I/O features (not shown) allowing the generated hyperspectral data 144 to be obtained by an external device for any suitable use in practice.

Figure 9:
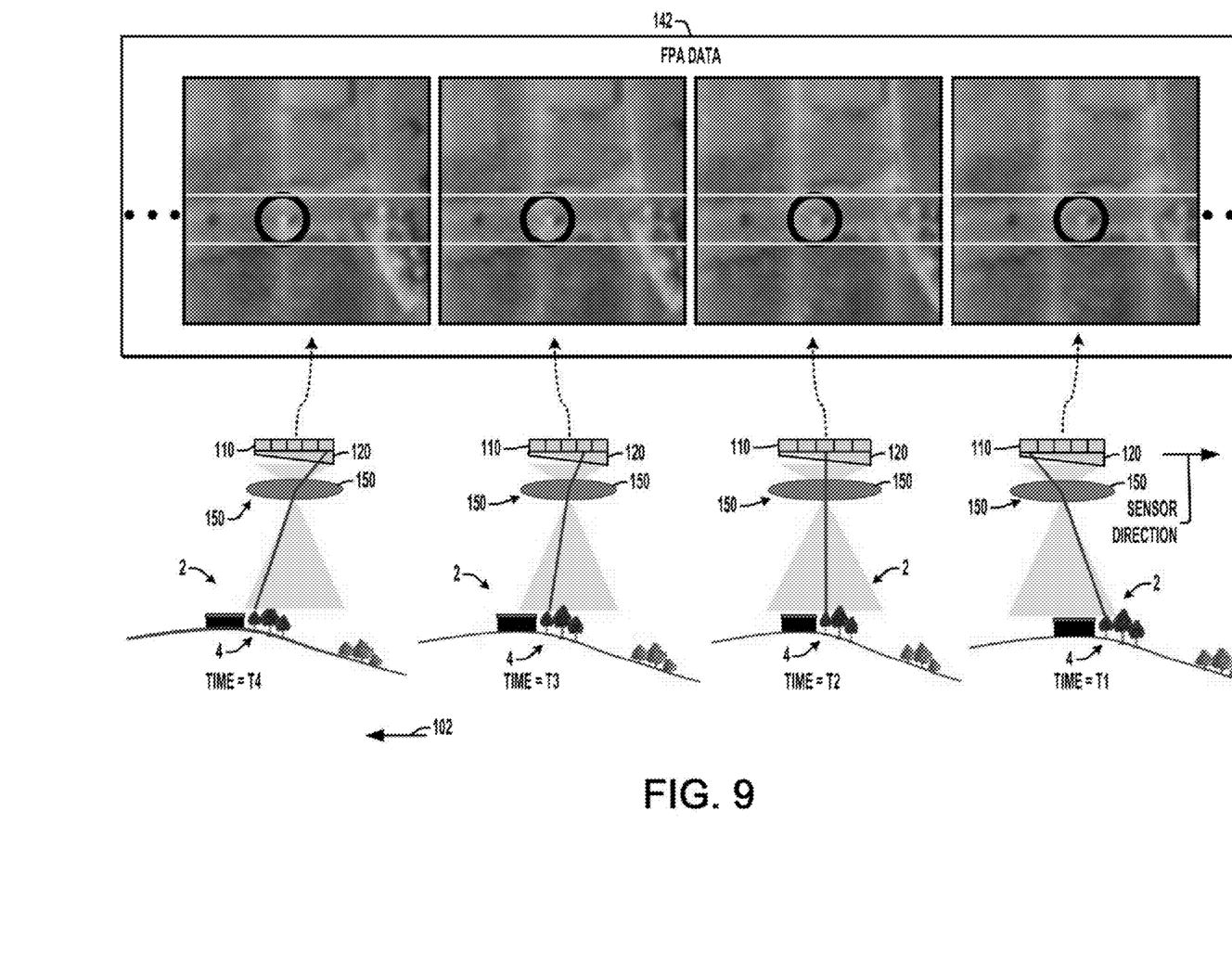
FIG. 9 illustrates scanning operation of the micro-spectral sensor at four discrete sample times and the resulting two-dimensional intensity measurement value data for the samples.

FIGS. 1-4 and 9 illustrate scanning operation of a first embodiment of the micro-spectral sensor 100 by movement of the sensor 100 itself in a sensor direction relative to the underlying scene 2, whereby the scene 2 is effectively scanned in the scan direction 102 relative to the FPA 110. At any given point in time, the underlying scene 2 is projected onto the sensing faces of the sensor elements 111-119 . . . N of the FPA 110. FIG. 1 illustrates a first exemplary sample time (T1) at which incoming light from the scene feature 4 is provided to sensor element 116 via the lens 150, and light from scene elements 6 is directed by the lens 152 sensor element 111. It is appreciated that the FPA 110 is a two-dimensional array structure, wherein only a single row of sensor elements is illustrated (at different X direction positions) for sake of simplicity. At T1, the FPA 110 obtains incoming light intensity measurement values (FPA data 142) from each of the sensor elements 111-119 . . . N of the array 110 and provides these to the processor 130, which then stores these in the memory 140. FIG. 9 schematically illustrates scanning at T1 (lower right in the figure) and two-dimensional image (light intensity) data 142 from the FPA 110 stored in the memory 140. In this initial set of measurement values 142, the data obtained from sensor element 116 (FIG. 1) corresponds to the location of the scene feature 4 at location X1 and the data from sensor element 111 corresponds to the scene element 6 at physical location X2.

Figure 2:
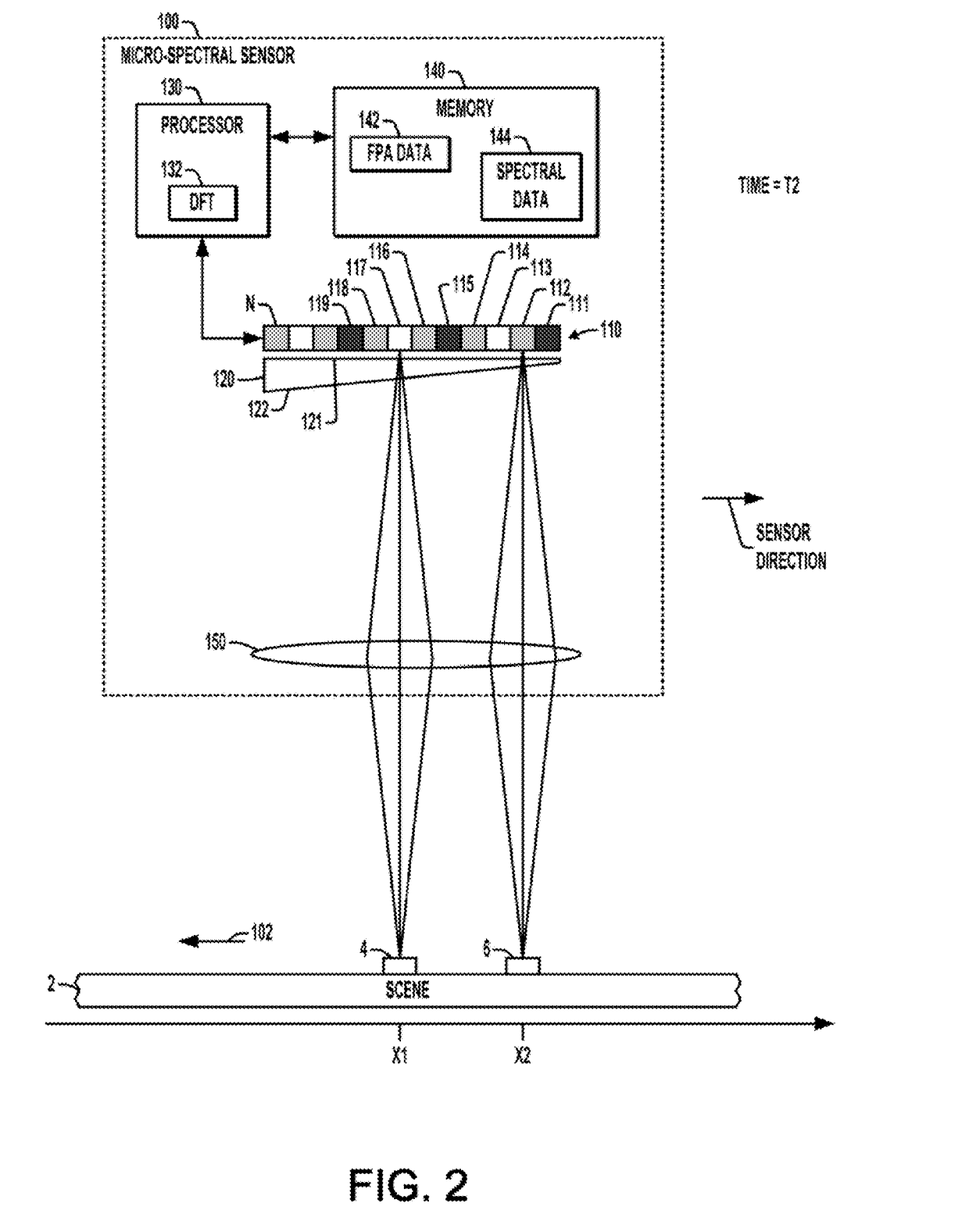
FIGS. 2-4 are side elevation views illustrating scene scanning by motion of the sensor apparatus along a scan direction relative to an underlying scanned scene.
Figure 3:
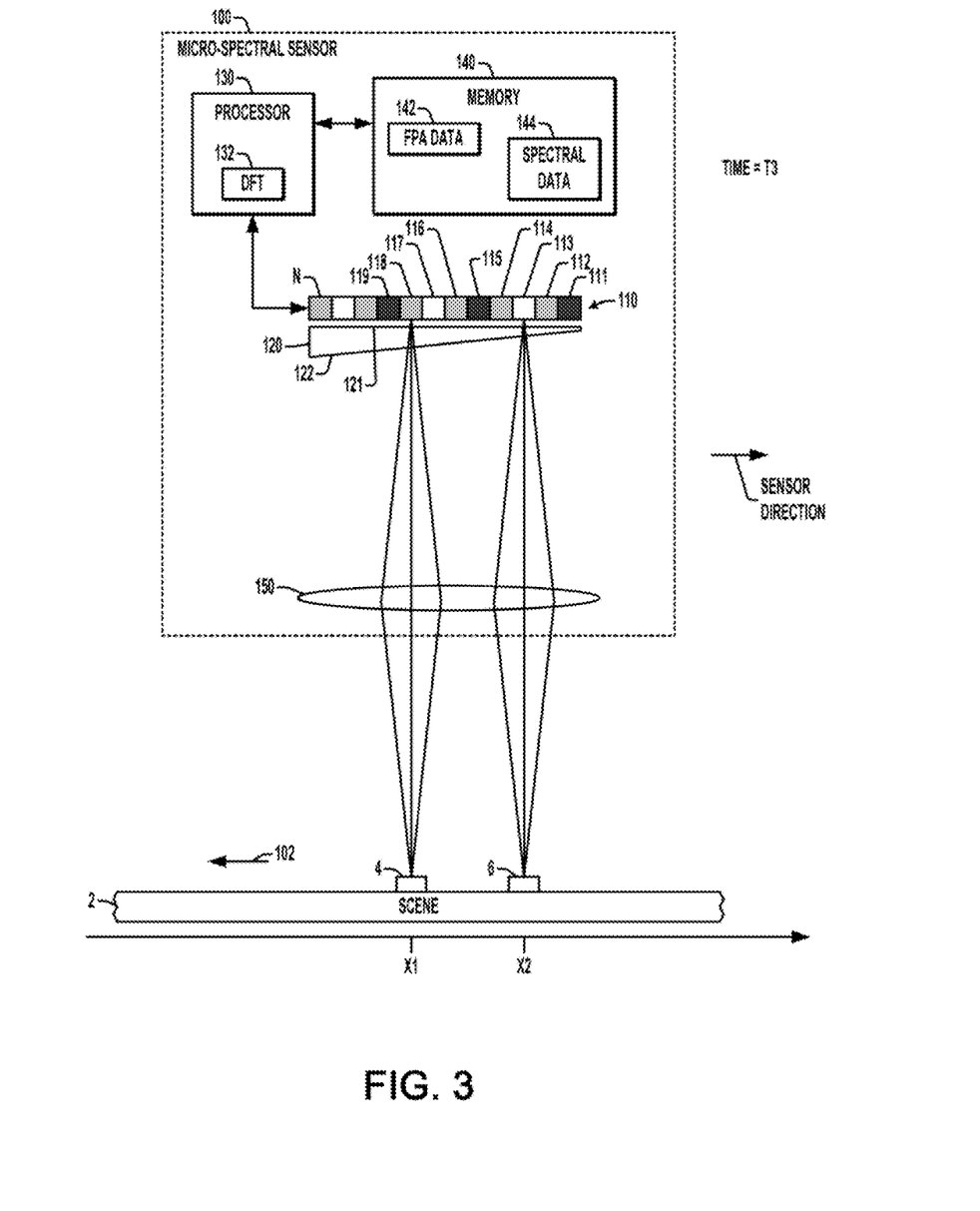
Figure 4:
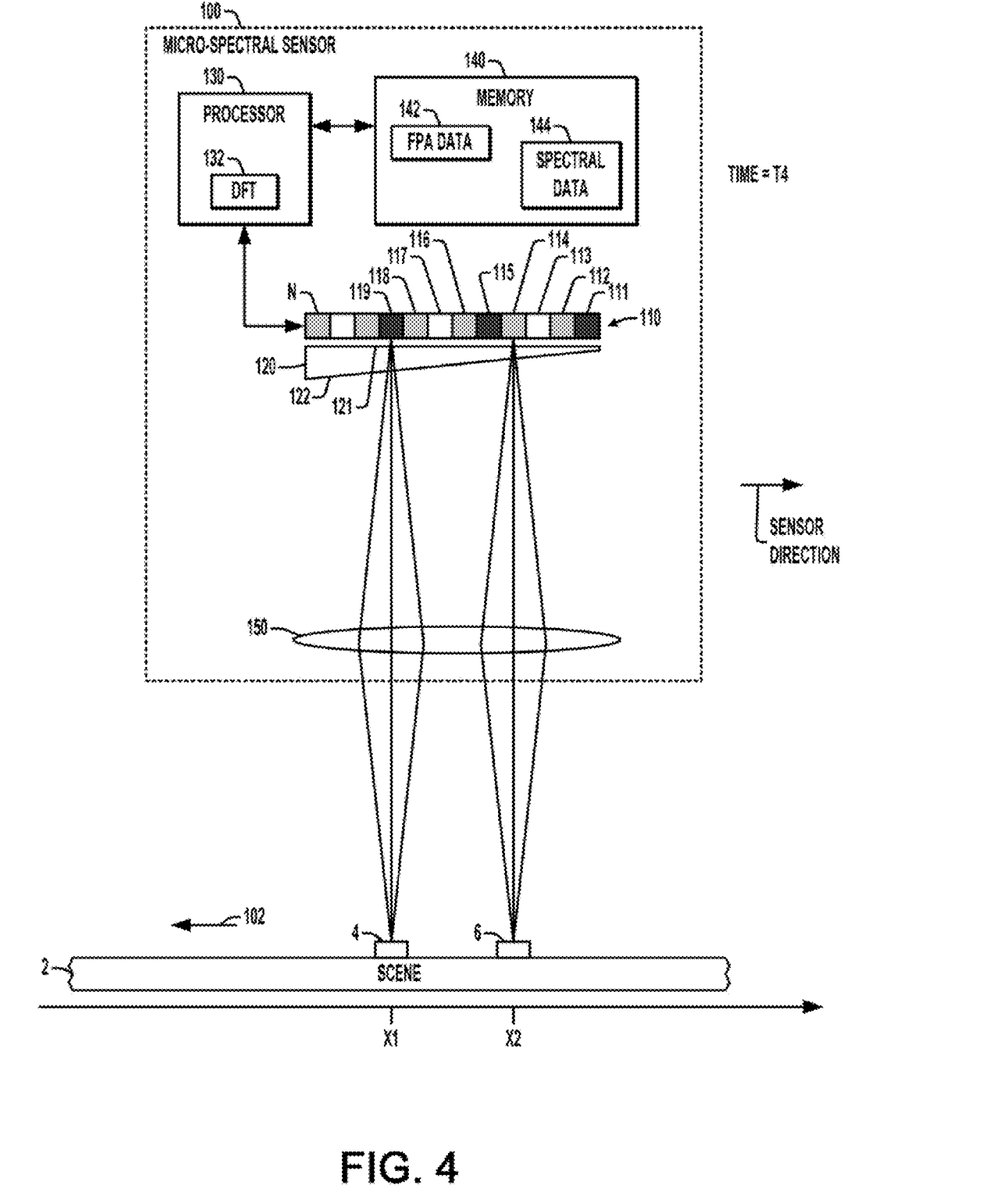

As seen in FIG. 2, continued motion of the micro-spectral sensor 100 relative to the scanned scene 2 changes the relative positioning of the FPA 110 and the physical locations X1 and X2 of the scene elements 4 and 6 such that at time T2 light from scene feature 4 (location X1) is directed by the lens 150 toward the sensor element 117 and light from feature 6 (location X2) is provided to sensor element 112 of the FPA 110. The FPA obtains another set of intensity measurement values at time T2 and stores these in the FPA data 142 of the memory 140. Continuing in FIG. 3, at time T3, yet another set of intensity measurement values is obtained by the FPA 110 in which the value from sensor element 118 corresponds to location X1 and the data from element 113 corresponds to location X2. FIG. 4 illustrates another exemplary relative scanning position at sample time T4 in which the intensity measurement value from sensor element 119 corresponds to the scene feature 4 at location X1 and the measurement value from sensor element 114 in the array corresponds to scene feature 6 at location X2.

As noted above, the processor 130 correlates the intensity measurement values of the FPA data 142 from multiple sensor elements of the FPA array obtained at different sample periods (e.g., T1-T4) with specific scene locations in the scanned scene 2 (e.g., locations X1 and X2 in the above example). This can be done by any suitable technique by which the processor 130 can determine the correlation between specific locations in the scanned scene 2 and the corresponding sensor elements of the array 110 at a given sample time For instance, the micro-spectral sensor 100 may be operatively interconnected with a navigation system of an aircraft that is flying along the scan direction 102 (e.g., or in the opposite "sensor direction" shown in FIGS. 1-4). Thus the processor 130 in certain embodiments will know the scan direction position of the sensor 100 itself, as well as the range (e.g. altitude) of the scanned scene 2. In other embodiments employing scanning mechanisms 104 (e.g., FIGS. 5-8 below), the processor 130 controls the scanning and thus will know the information necessary to correlate specific locations on the scanned scene 2 with data from specific sensor elements of the array 110 at specific sample times.

Figure 10:
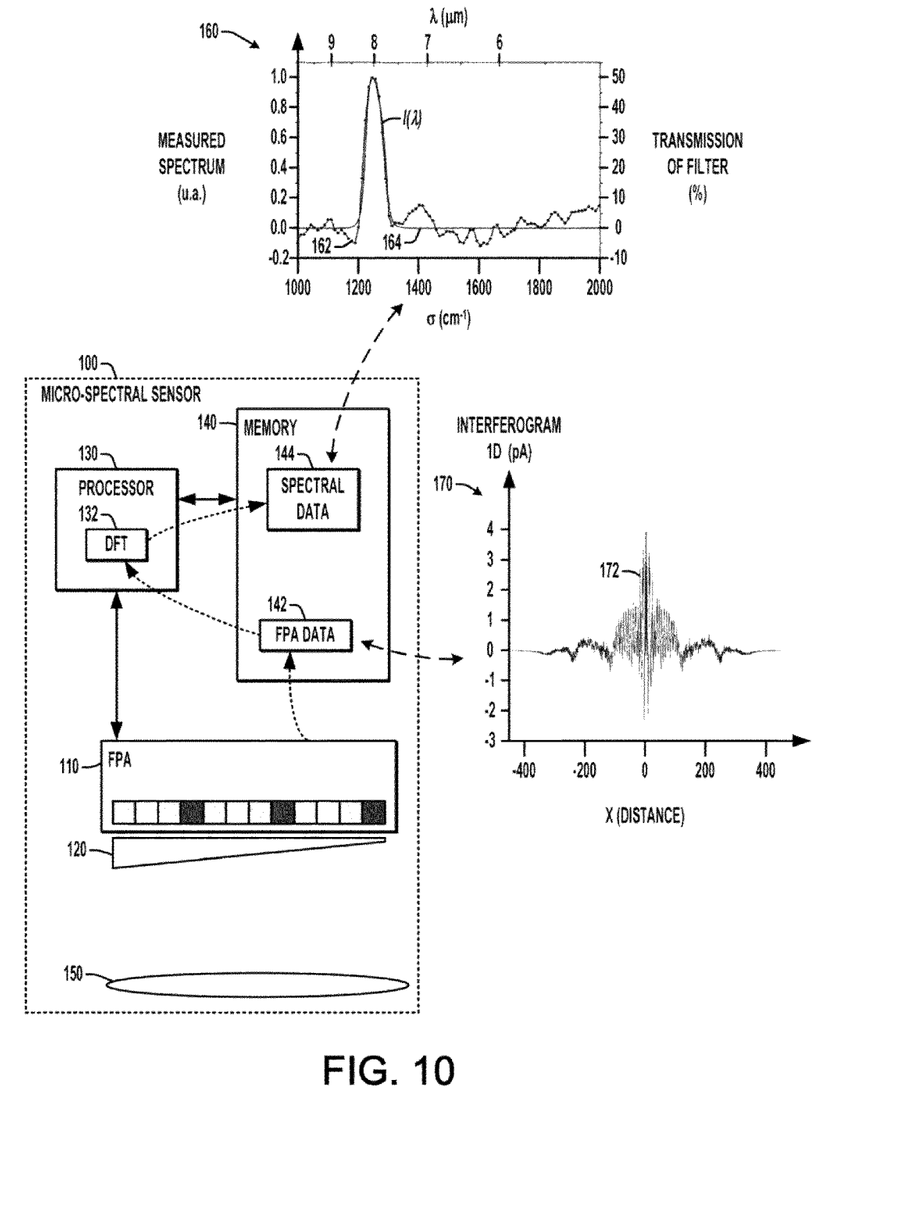
FIG. 10 illustrates data processing in the micro-spectral sensor in which intensity measurement values correlated to a specific scanned location are Fourier transformed to generate spectral data for that location.

Referring also to FIG. 10, with this information, a determination can be made by the processor 130 as to which intensity measurement values in the FPA data 142 correspond to any particular location in the scanned scene 2. In this regard, this applies as well to the second dimensional axis of the array 110 (e.g., into the page in the illustrated views), whereby the processor 130 can perform a correlation of an entire two-dimensional scanned area and any particular location thereof to determine which measurement intensity values 142 correspond with a particular location.

Referring also to FIG. 10, the data 142 correlated to a given scene location 4, 6 is thus represented as an intensity value $I_{out}(p)$ as a function of a given pixel location p (e.g., two-dimensional location in the scanned scene 2), as set forth in the following equation:

$$I_{out}(p) = I_o e^{i\frac{\pi n_w \gamma p \Delta x}{\lambda}}, \quad (1)$$

where $I_o$ is a scaling factor, $n_w$ is the index of refraction of the wedge interference filter 120, $\gamma$ is the wedge angle (angle 128 in FIG. 1), p is a pixel number (integer), $\Delta x$ is the scan direction distance increment for each sample period, and $\lambda$ is wavelength in meters. It is noted that multiple wavelengths result in superposition of intensity patterns as set forth in the following equation:

$$I_{out}(p) = \sum_j I_{o,j} e^{i\frac{\pi n_w \gamma p \Delta x}{\lambda_j}} \quad (2)$$

FIG. 10 illustrates an exemplary graph 170 showing a portion 172 of the FPA data 142 as a function of distance along the X direction. As seen in this figure, the processor 130 implements a discrete Fourier transform (DFT) operation 132 based on such correlated portions of the FPA data 142 to generate and store spectral data 144 in the memory 140. For instance, for each particular pixel location within the scanned scene 2, the processor 130 performs a Fourier transform I(p) →I(λ) of the corresponding measured intensity values from the FPA 110, using the following formula:

$$I(\lambda) = \int_0^X I(x) e^{-i\frac{\pi n_w \gamma x}{\lambda_j}} dx \quad (3)$$

whereby this transformation will generate a frequency domain representation of the measured light intensity received from that location in the scanned scene 2 (and hence a wavelength domain representation). FIG. 10 illustrates an exemplary graph 160 showing the resulting measured spectrum I(λ) for a particular scanned scene location (e.g., location 4 in FIGS. 1-4 above), including a raw data amplitude value curve 162 as a function of wavelength and a corresponding smoothed (e.g. filtered) curve 164. At any given location in the scanned scene 2, moreover, there may be several wavelengths having non-zero amplitudes in the spectral data 144, whereby the micro-spectral sensor 100 can be used for HSI analysis.

The inventors have appreciated that the use of the wedge interference filter 120 with thickness changing along the scan direction 102 results in sampled measurement values obtained through a different thickness of the filter 120. In this structure, light incident on, and passing through, the wedge filter 120 constructively or destructively interferes along the direction of the wedge thickness variation (e.g., thickness increase or decrease along the scan direction 102). The intensity of the signal for a particular scene location varies as a function of distance along the wedge 120 as dictated by the interference pattern of the light. The Fourier transform of the correlated intensity measurement values 142 generates the corresponding spectral content of the incident signal (e.g., graph 160 in FIG. 10). The sensor 100 in certain embodiments therefore uses Fizeau principles to obtain the spectra of a complete, complex image or scene 2 by scanning the imaged scene 2 relative to the FPA 110 in unison and is integrated in such a way as to reproduce the spectra of each point in the scene 2. This is shown in FIG. 9 in which the FPA 110 is moved such that the scene 2 is scanned along the direction 102 of increasing thickness of the wedge filter 120. This data 142 is stored in time and correlated for Fourier transformation to create the spectral data 144 illustrated in the graph 160 of FIG. 10 (as well as similar spectral graphs for any or all of the other pixel locations of the scanned scene 2). It is further noted that because the FPA 110 obtains signals continuously during operation, the collection efficiency is at least an order of magnitude better than a spectrometer that uses a grating or prism in which a slit is scanned across an image scene. In addition, because there are multiple rows along the direction of the wedge increasing thickness, these other parallel rows yield spectra information for other spectral parts of the scene 2 being scanned.

The processor 130 insurers that each scanned object in the scene 2 can be located precisely so that its position on the FPA is known. Ideally an object in the scene stays in the same row for the complete scan; however in practice this may not be possible. In other words, the scanning may not be strictly along the scan direction 102, which may lead to "object wobble" during scanning. In certain embodiments, therefore, the processor 130 may be programmed to implement one or more algorithms to track an object to determine the appropriate FPA sensor element that is imaging a given scene location at a given sample period. The disclosed sensor 100 therefore provides full scene spectroscopy imaging with the ability to identify different wavelength bands at each given pixel location of a full scene 2, while eliminating grating and reducing lens size requirements to facilitate small form factor and lightweight construction, while increasing collection efficiency. Moreover, because the sensor 100 processes the entire scanned scene 2 continuously, its duty cycle may be multiple orders of magnitude better than conventional grating spectrometers that use a scanned slit.

Figure 5:
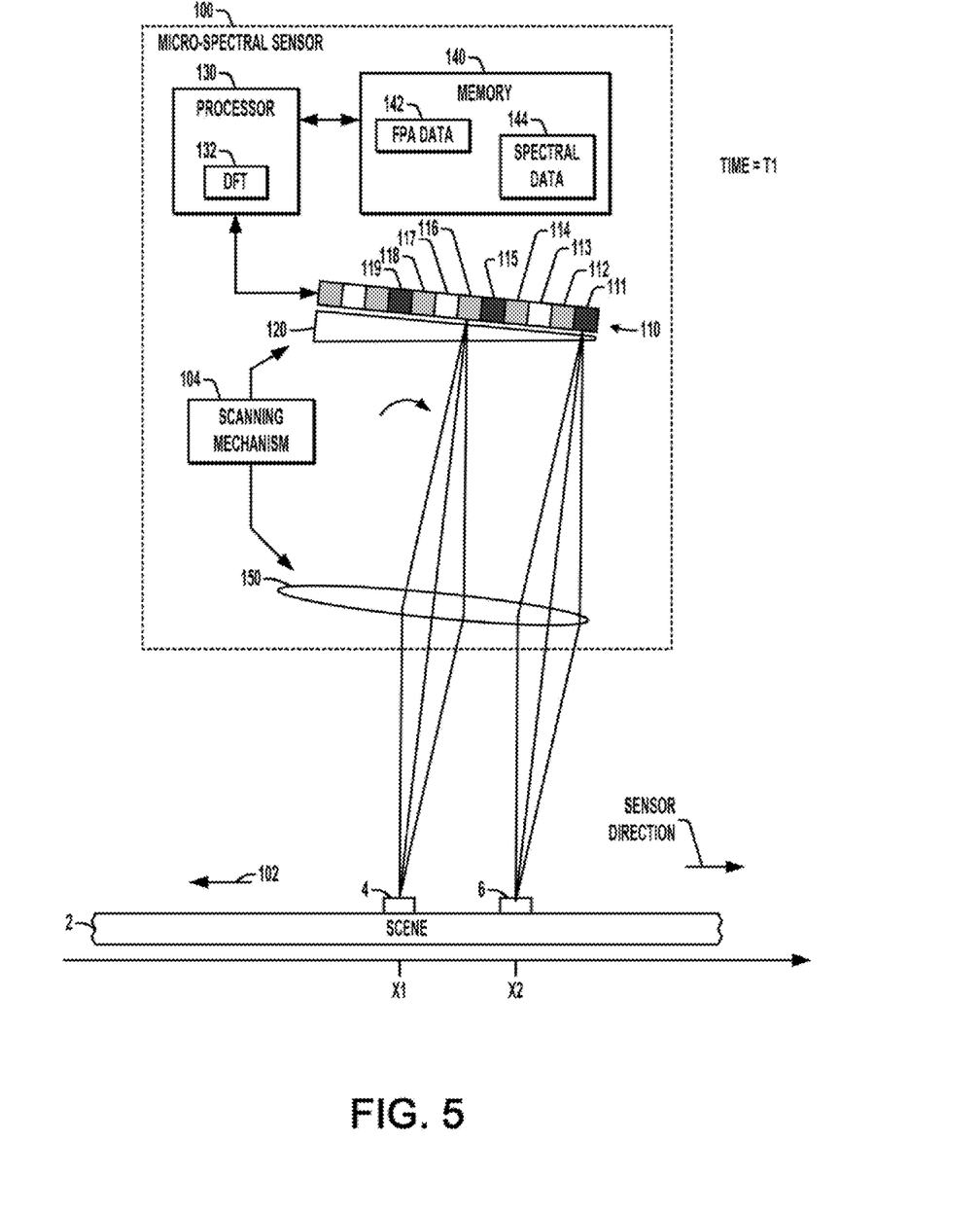
FIGS. 5 and 6 are side elevation views illustrating a micro-spectral sensor embodiment with a scanning mechanism operative to selectively rotate the FPA, the wedge and the lens to scan the underlying scene across the FPA.
Figure 6:
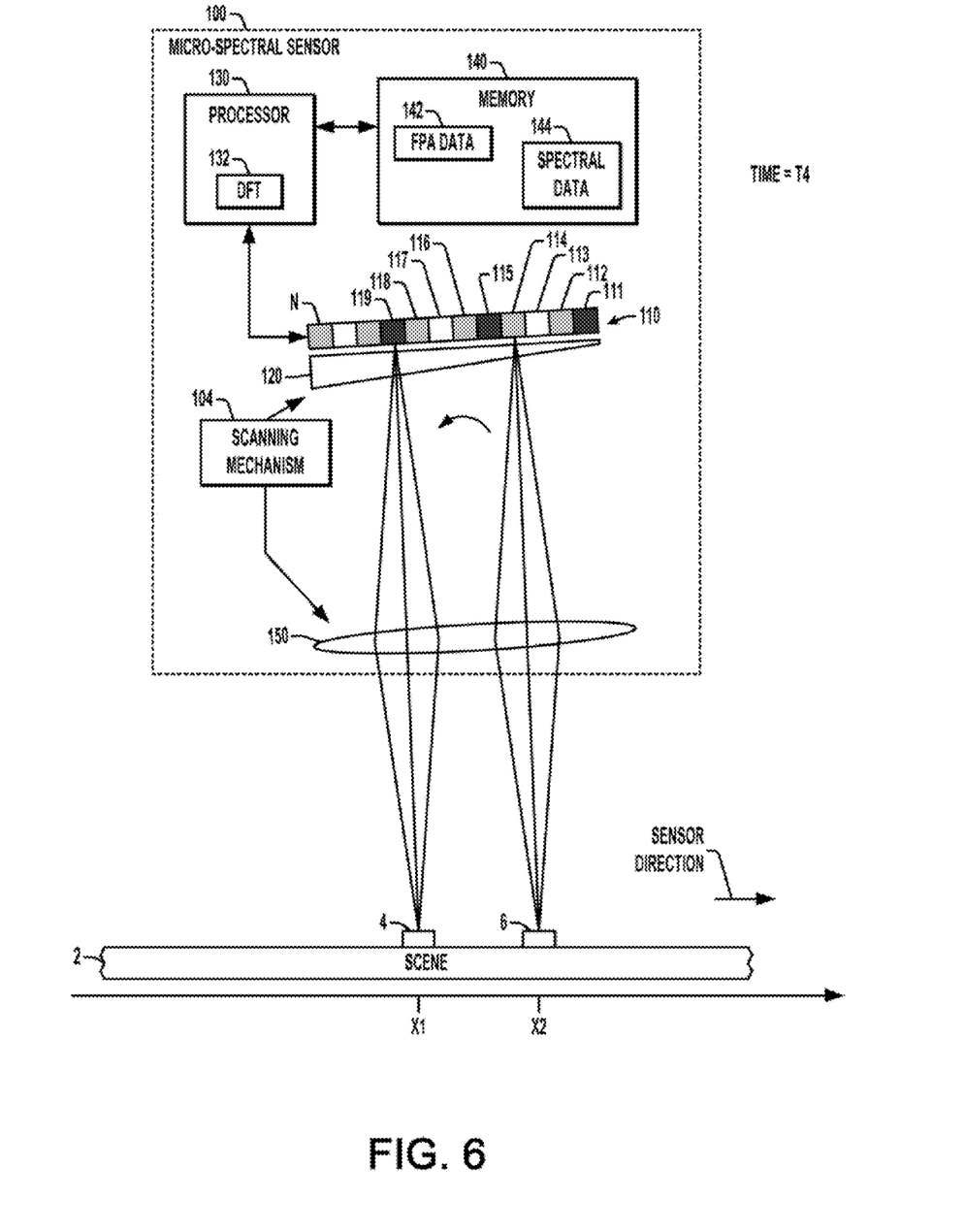

Referring also to FIGS. 5-8, in certain embodiments, the sensor 100 includes a scanning mechanism 104 operative under control of the processor 130 to rotate the lens 150 so as to scan the scene 2 across all or a portion of the FPA 110 along the scan direction 102. As seen in FIGS. 5 and 6, in certain embodiments, the scanning mechanism 104 includes suitable mechanical rotating actuators (not shown) in order to contemporaneously rotate the FPA 110, the associated wedge interference filter 120, and the lens 150 in a coordinated fashion in order to effectively scan the scene image 2 across the focal plane of the FPA 110 through the lens and the wedge filter 120. FIG. 5 illustrates one rotational position at sample time T1 in which the incident light from the scene feature 4 is received at sensor element 116 of the FPA 110, and light from the scene feature 6 is received at sensor element 111. FIG. 6 illustrates another exemplary sample time T4 at which rotation of the FPA 110, the wedge filter 120 and the lens 150 in a counterclockwise direction results in light being received from the scene feature 4 via the sensor element 119 and light from the scene feature 6 being received at the sensor element 114.

Figure 7:
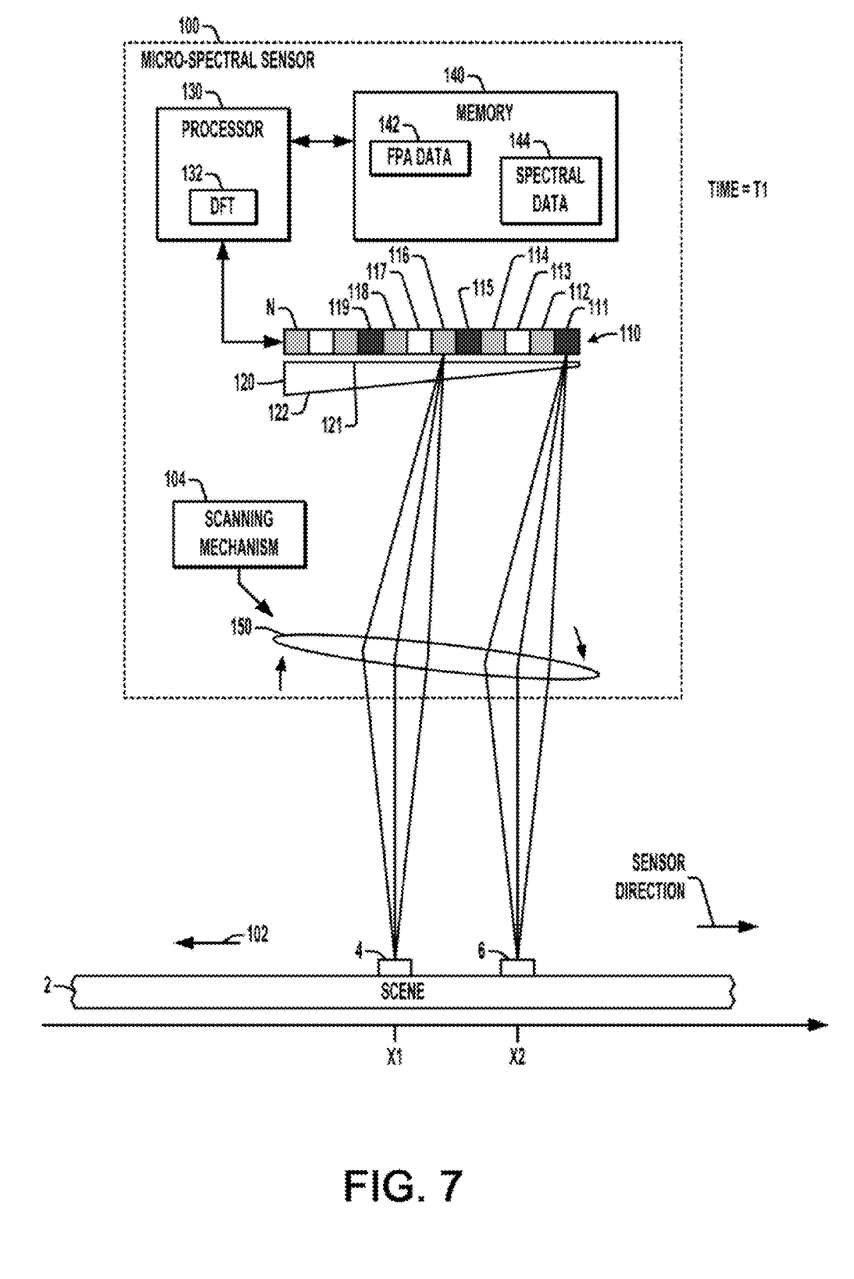
FIGS. 7 and 8 are side elevation views illustrating another micro-spectral sensor embodiment in which a scanning mechanism selectively rotates the lens in order to scan the underlying scene across the FPA.
Figure 8:
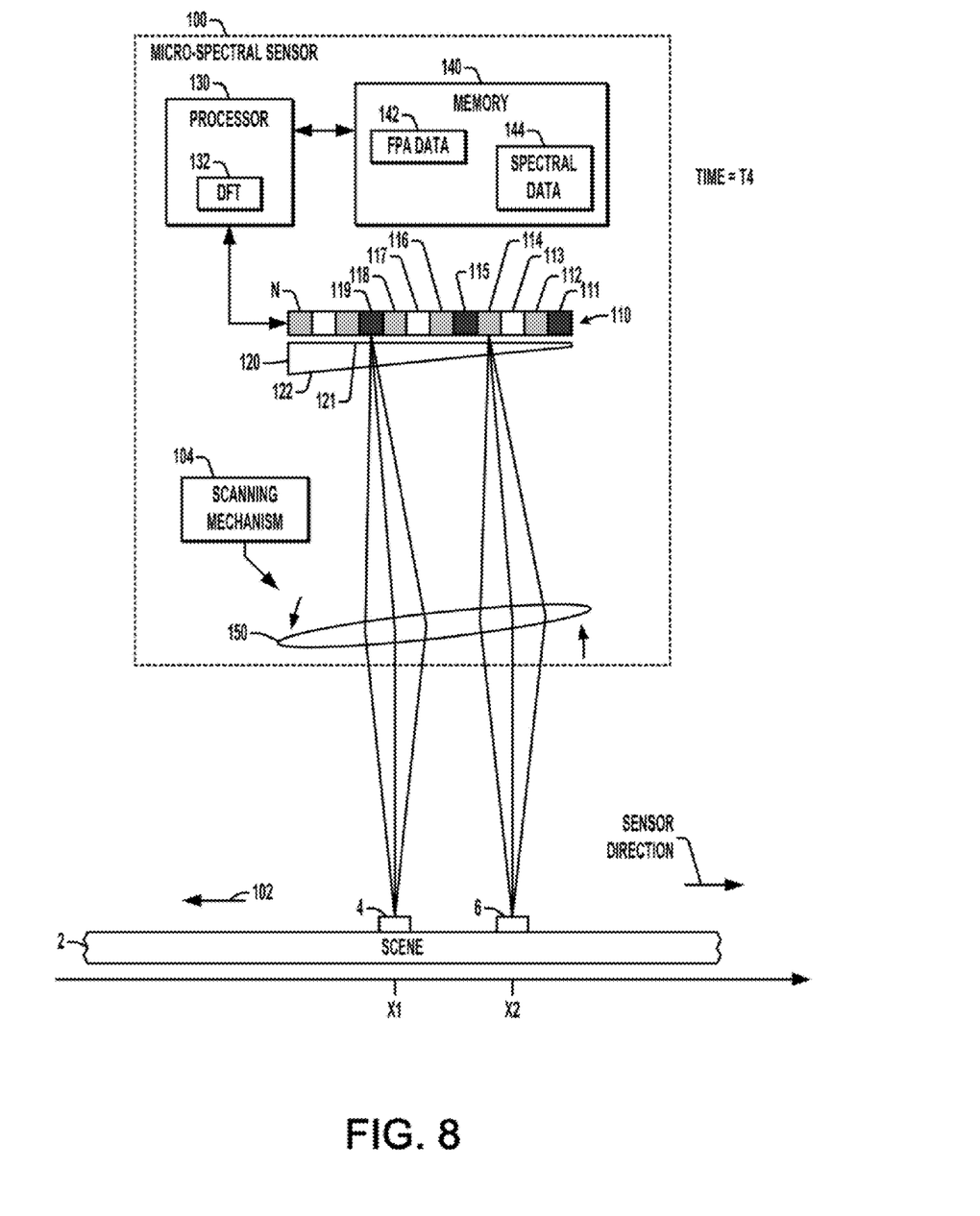

FIGS. 7 and 8 illustrates another exemplary embodiment with a scanning mechanism 104 that operates to rotate the lens 150, while the FPA 110 and the wedge filter 120 are fixed. FIG. 7 illustrates an example at sample time T1 in which incoming light from the scene feature 4 is received through the rotated lens 150 and the fixed wedge filter 120 by the sensor element 116 of the FPA 110, and light from the scene feature 6 is received by the sensor element 111 of the FPA 110. FIG. 8 illustrates a subsequent sample time T4 at which the lens 150 has been rotated in a counterclockwise direction by the scanning mechanism 104 such that light from the scene feature 4 is received at the FPA sensor element 119 and light from the scene feature 6 is received at the sensor element 114 of the FPA 110.

Figure 11:
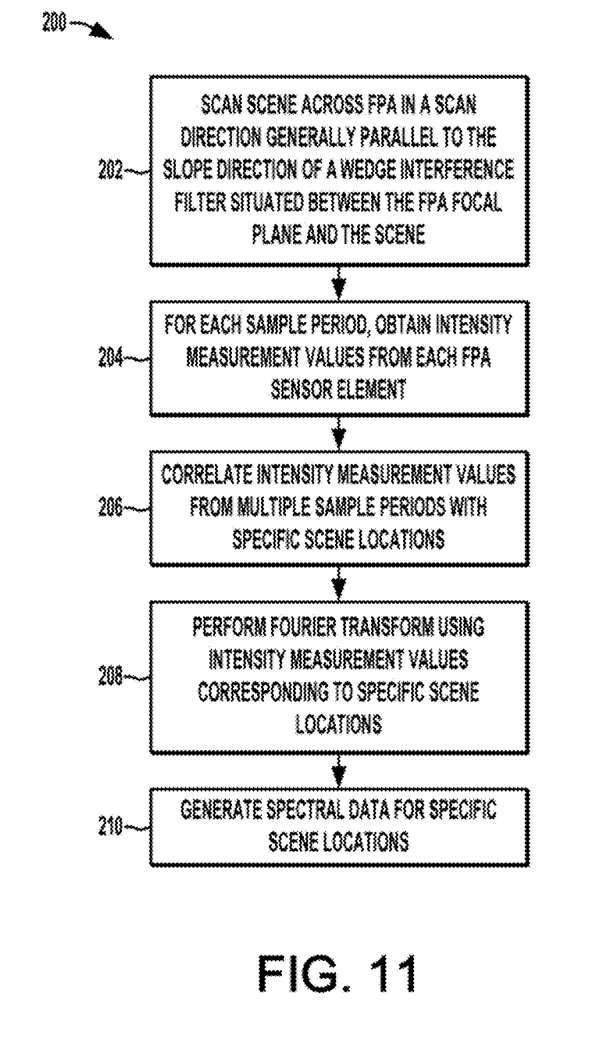
FIG. 11 is a flow diagram illustrating an exemplary process for generating spectral data for a scanned scene in accordance with the present disclosure.

FIG. 11 illustrates an exemplary method or process 200 for generating spectral data for a scanned scene in accordance with the present disclosure. The method 200 includes scanning a scene at 202 (e.g., scene 2 above) in a scan direction (102) across all or a portion of a focal plane array (e.g., FPA 110 above) in order to direct incoming light from the scene 2 toward the FPA 110 through a wedge interference filter (120) that has varying thickness along the scan direction 102. At 204 in FIG. 11, a plurality of intensity measurement values are received from the FPA 110 for each of a plurality of sample periods as the scene 2 is scanned across the FPA 110. At 206, the intensity measurement values from multiple sensor elements of the FPA, obtained at different sample periods, are correlated with one or more specific scene locations (e.g., scene locations 4, 6 above). At 208, a Fourier transform is performed using the intensity measurement values corresponding to the specific scene location or locations. At 210, spectral data is generated for the specific scene location(s), and this may be stored in local memory or may be otherwise made available for analysis or other uses. As noted above, the method 200 may optionally include rotating a lens (e.g., lens 150 in FIGS. 5-8 above) to scan the scene 2 across the FPA 110, and may further include rotating the FPA 110 and the wedge interference filter 120 (e.g., FIGS. 5 and 6 above) to implement scanning.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A micro-spectral sensor, comprising:
    a focal plane array (FPA) having a plurality of sensor elements with sensing faces formed in a two-dimensional array in a focal plane;
    a wedge interference filter, comprising:
        a first side extending between first and second opposite ends in a first plane generally parallel with the focal plane of the FPA,
        a second side extending between a first end proximate the first end of the first side and a second end proximate to and spaced from the second end of the first side, the second side disposed in a second plane at a nonzero angle relative to the first plane of the first side, the first side extending between the second side and the FPA;
    a lens directing incoming light from a scanned scene toward the FPA through the first and second sides of the wedge interference filter;
    an electronic memory; and
    a processor operatively coupled with the FPA and the memory to:
        obtain a plurality of intensity measurement values from the FPA for each of a plurality of sample periods as a scene is scanned across at least a portion of the FPA along a scan direction generally parallel to a line extending between the first and second opposite ends of the first side,
        store the plurality of intensity measurement values in the electronic memory,
        correlate intensity measurement values from multiple sensor elements of the FPA obtained at different sample periods with at least one specific scene location, and
        perform a Fourier transform using intensity measurement values corresponding to the at least one specific scene location to generate spectral data for the at least one specific scene location.

2. The micro-spectral sensor of claim 1, wherein the processor is operative to store the spectral data for the at least one specific scene location in the electronic memory.

3. The micro-spectral sensor of claim 1, wherein the wedge interference filter is a compact thin-film wedge Fizeau interferometer.

4. The micro-spectral sensor of claim 1, wherein the wedge interference filter provides reflection of the incoming light from the lens from two surfaces of the wedge structure formed by the first and second sides.

5. The micro-spectral sensor of claim 1, comprising a scanning mechanism operative to rotate the lens to scan the scene across at least a portion of the FPA along the scan direction.

6. The micro-spectral sensor of claim 5, wherein the scanning mechanism is operative to rotate the FPA and the wedge interference filter to scan the scene across at least a portion of the FPA along the scan direction.

7. The micro-spectral sensor of claim 1, wherein the scanning mechanism is operative to rotate the FPA and the wedge interference filter to scan the scene across at least a portion of the FPA along the scan direction.

8. The micro-spectral sensor of claim 1, wherein the wedge interference filter is bonded to the FPA along at least a portion of the focal plane.

9. The micro-spectral sensor of claim 1, wherein the wedge interference filter is made of solid material.

10. The micro-spectral sensor of claim 1, wherein the wedge interference filter is made of air.

11. The micro-spectral sensor of claim 1, wherein the FPA comprises a plurality of charge-coupled device (CCD) sensor elements with sensing faces formed in a two-dimensional array in a focal plane.

12. The micro-spectral sensor of claim 1, wherein the FPA comprises a plurality of CMOS optical sensor elements with sensing faces formed in a two-dimensional array in a focal plane.

13. A method of generating spectral data for a scanned scene, the method comprising:
scanning a scene in a scan direction across at least a portion of a focal plane array (FPA) to direct incoming light from the scene toward the FPA through a wedge interference filter having a thickness that changes along the scan direction;
obtaining a plurality of intensity measurement values from the FPA for each of a plurality of sample periods as the scene is scanned across the portion of the FPA;
correlating intensity measurement values from multiple sensor elements of the FPA obtained at different sample periods with at least one specific scene location;
performing a Fourier transform using intensity measurement values corresponding to the at least one specific scene location; and
generating spectral data for the at least one specific scene location of the scene.

14. The method of claim 13, further comprising storing the spectral data for the at least one specific scene location of the scene in an electronic memory.

15. The method of claim 13, wherein the wedge interference filter provides reflection of the incoming light from two surfaces of the wedge structure formed by the first and second sides.

16. The method of claim 13, wherein scanning the scene across at least a portion of the FPA comprises rotating a lens to scan the scene across at least a portion of the FPA along the scan direction.

17. The method of claim 16, wherein scanning the scene across at least a portion of the FPA comprises rotating the FPA and the wedge interference filter to scan the scene across at least a portion of the FPA along the scan direction.

18. The method of claim 13, wherein scanning the scene across at least a portion of the FPA comprises rotating the FPA and the wedge interference filter to scan the scene across at least a portion of the FPA along the scan direction.

* * * * *